Dec. 16, 1969    J. S. GOLIGHTLY    3,484,226
OUTLINE MOLD FOR SUPPORTING GLASS SHEETS
Filed Aug. 25, 1966
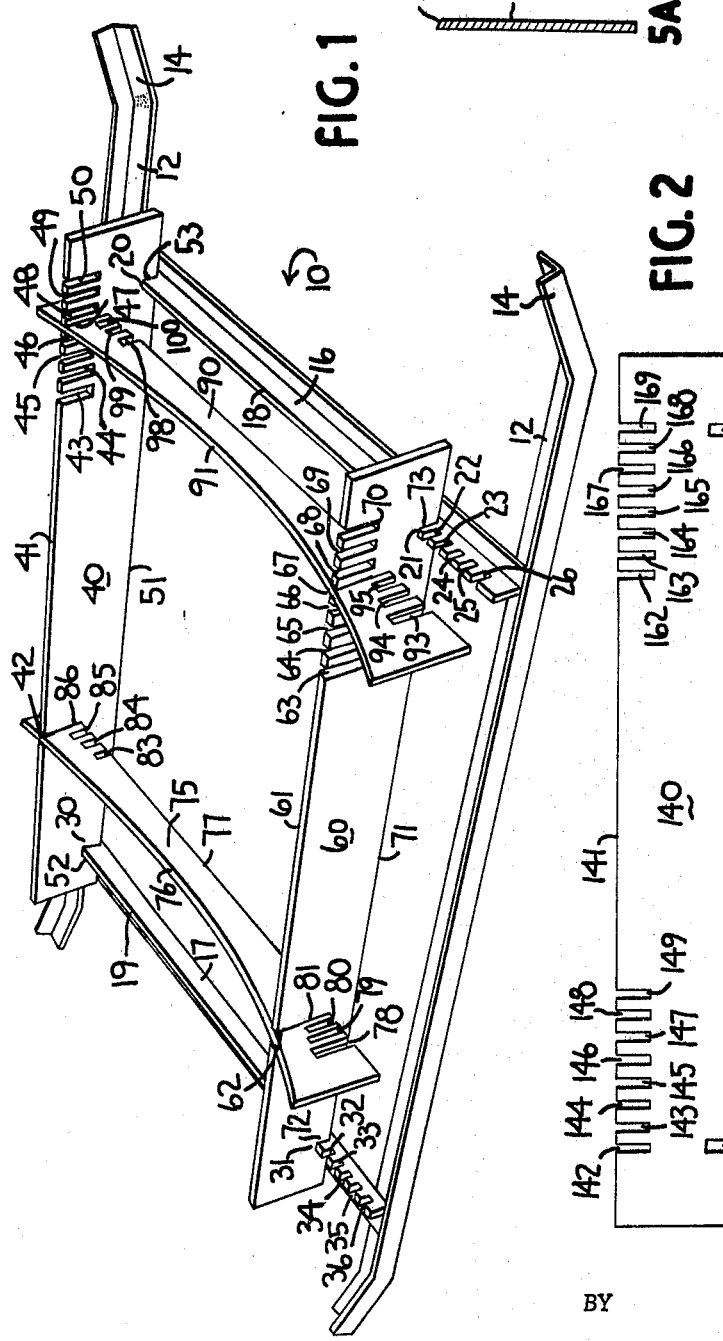
INVENTOR
JAMES S. GOLIGHTLY
BY
Chisholm and Spencer
ATTORNEYS

United States Patent Office

3,484,226
Patented Dec. 16, 1969

3,484,226
OUTLINE MOLD FOR SUPPORTING
GLASS SHEETS
James S. Golightly, Pittsburgh, Pa., assignor to PPG
Industries, Inc., a corporation of Pennsylvania
Filed Aug. 25, 1966, Ser. No. 575,030
Int. Cl. C03b 25/00, 27/00, 29/00
U.S. Cl. 65—291                                      3 Claims

ABSTRACT OF THE DISCLOSURE

Apparatus for supporting glass sheets during thermal processing whereby an open frame-like carriage supports a glass sheet support apparatus of outline configuration. The open frame-like carriage comprises carriage members having a series of notches on their upward facing surface. A pair of replaceable elongated rails and a pair of replaceable connecting rails comprise the support apparatus. The elongated rails have upper and lower notched edge portions each portion having a spaced pair of notches. The connecting rails also have a lower edge portion having a spaced pair of notches. The notches on the lower edge portion of the elongated rails fit into aligned notches in the carriage members and the notches on the connecting rails fit into aligned notches on the upper edge portion of the elongated rails. Thus, a substantially rectangular outline is formed of adjustable and replaceable support members.

---

It is well known to support glass sheets for thermal processing on outline supports which engage the glass near its marginal edge while the glass is subject to thermal processing. Such thermal processing is necessary for certain bending, annealing, tempering and coating operations. It is conventional to heat a glass sheet above a predetermined temperature such as its strain point and then controllably cool it while so supported to accomplish one or more of the operations mentioned above.

While the illustrative embodiment of the present invention described below relates to an outline type bending mold that can be used to bend different patterns of glass sheets by changing or adjusting the glass edge supporting elements, it is understood that the principles of the present invention can be applied equally for thermal processing of glass sheets that are already shaped or glass sheets that are flat and are to be thermally processed and maintained in their original configuration during the thermal processing.

A large number of patterns of glass sheets sold commercially have the same general outline and differ from one another only in dimensions and in radius of curvature. Such patterns are usually shaped by placing flat glass sheets cut to the desired dimensions on an outline type bending mold and conveying the glass laden mold through a tunnel type furnace. In the furnace, the glass temperature is increased until the deformation point of the glass is exceeded. This deformation point is about 1080 degrees Fahrenheit for commercial plate glass, float glass, or sheet glass of the soda-lime-silica type having a nominal thickness of ¼ inch. As the glass reaches its deformation temperature, it sags by gravity and the portion adjacent its periphery conforms to the curvature of the upwardly facing surfaces of the peripheral supporting elements of the outline mold.

The shaped glass sheet is cooled below its strain point while still supported on the mold. When the bent glass is to be tempered, it is chilled suddenly while still above the deformation temperature. When the glass is to be annealed, it is cooled more gradually by a controlled cooling operation in order to control the stresses that are established in the glass during its cooling from above the annealing range to below the strain point.

In the past, individual molds have been prepared for each pattern. For mass production operations, several molds are usually required for each pattern in order to produce a large number of parts economically and in a reasonably short period. Such molds comprise peripheral shaping members or shaping rails disposed edgewise with their upper edge surfaces formed to close tolerances to insure that the bent glass articles conform within the specifications established by the customers. The peripheral shaping members are usually welded to carriages or frames which are conveyed through the bending furnace. Such shaping molds are fabricated to specified outline dimensions and curvatures and are rigidly fixed to the carriages or mold supporting members. Therefore, molds so constructed can only be used to produce a single specific pattern and must be disassembled and reconstructed to form a different pattern. Furthermore, once a mold of this type is disassembled, it is no longer available for future production of the initial pattern unless it is reassembled.

To overcome the above difficulties, the present invention suggests an adjustable outline mold that can easily be adjusted and modified to accommodate different patterns. The glass sheet support apparatus of outline configuration is supported on an open frame-like carriage comprising a pair of elongated, spaced carriage members having an upward facing surface. According to the present invention, a series of notches are provided on the upper facing surface of the spaced carriage members.

The glass sheet support apparatus of the present invention comprises a pair of elongated rails disposed edgewise, each having upper and lower notched edge portions. A pair of the lower notched edge portions of one of the elongated rails fits into aligned notches at one side of the longitudinal center of each of the elongated spaced carriage members and a pair of lower notched portions of the other of the pair of elongated rails fits into aligned notched portions at the other side of the longitudinal center of each of the elongated, spaced carriage members.

The glass support apparatus also includes a pair of edgewise disposed connecting rails. Each of the connecting rails has lower notched edge portions. A pair of the lower notched edge portions of one of the pair of connecting rails fits into aligned upper notched portions of the elongated rails at one side of the longitudinal center of each of the elongated rails and another pair of the lower notched edge portions of the other of the pair of connecting rails fits into aligned under notched portions of the elongated rails at the other side of the longitudinal center of the elongated rails. Thus, the elongated rails and the connecting rails provide a glass supporting frame of outline configuration composed of replaceable rail sections adjustable in position relative to one another to provide an outline slightly smaller than the outline of a glass sheet to be thermally treated.

In case the glass supported on the glass supporting frame is to be bent by gravity sagging, the upper surface of at least one of the rails (the elongated rails or the connecting rails) is curved in elevation so that the elongated rails and connecting rails cooperate to provide an outline shaping surface having an outline slightly smaller than the outline of a glass sheet supported therein for bending and conforming in elevation to the curved shape desired for the glass sheet peripheral portion after the latter is bent by gravity sagging.

A further refinement that may be incorporated in the present invention when the connecting rails have an upper edge surface of cocave elevation is to provide notched portions of different heights along the length of the lower portions of said connecting rails with the uppermost extremities of the notched portions spaced essentially equal vertical distances from the upper edge surface of the connecting rails. This permits the upper edge surfaces of the connecting rails to form smooth continuations of the upper edge surfaces of the elongated rails.

Whenever a change of production is desired, it is a simple matter to alter the outline dimensions of the mold. The spacing between the elongated rails is changed by fitting the downwardly facing notches of the elongated rails into one or more different upwardly facing notches of the carriage members to provide a proper dimension between the elongated members in one direction. The other dimension of the mold is changed by adjusting the distance between the connecting rails by fitting their lower notched edge portions into the proper upward facing notches of the upward facing notched portions of the elongated rails. Also, if the glass sheet is to be bent to a different shape in the case of a bending operation, it is equally simple to replace one or more shaping rails having one configuration for a previously used shaping rail having a different configuration.

An illustrative example of an outline bending mold will be described for purposes of illustrating the present invention. In the drawings which form part of the description of the present invention and wherein like reference numbers refer to like structural elements, FIG. 1 is a perspective view of a typical mold constructed according to the present invention;

FIG. 2 is a longitudinal elevation of an elongated rail included in a variation of the apparatus of FIG. 1;

FIG. 3 is a longitudinal elevation of a connecting rail having an upper shaping surface of one configuration;

FIG. 4 is a longitudinal elevation of a connecting rail having an upper shaping surface of a different configuration from that of FIG. 3 and which can replace the shaping rail of FIG. 3 very readily according to the teachings of the present invention; and FIG. 5 comprises a pair of views 5A and 5B, showing a fragmentary sectional view of a pair of elongated shaping rails adapted for use with the present invention.

In the drawings, reference number 10 refers to a frame-like carriage provided with a pair of transversely spaced elongated runners 12. Each of the runners has an oblique end portion 14. The runners are designed to be supported on a series of conveyor rolls for conveyance through a typical mass production furnace of tunnel-like configuration.

A pair of elongated, spaced carriage members 16 and 17 interconnect the runners 12 intermediate their ends to form with the runners a frame-like carriage. Carriage member 16 has a notched upper surface 18, whereas carriage member 17 has a notched upper surface 19. Upper surface 18 is shown containing a notch 20 to one side of its longitudinal center and a plurality of notches 21 to 26 to the other side thereof. However, either or both sides may be provided with a plurality of notches. The notched upper edge 19 of carriage member 17 is provided with a notch 30 aligned with a notch 20 of carriage member 16, and a plurality of notches 31 through 36 that are in respective alignment with the notches 21 to 26 of the first carriage member 16.

An elongated rail 40 having an upper edge portion 41 provided with a notch 42 to one side thereof and a plurality of notches 43 through 50 to the other side of the notched upper edge portion 41 forms one side of a frame for supporting a glass sheet for thermal treatment. Elongated rail 40 is provided with a notched lower portion having a notch 52 to one side thereof and another notch 53 to the other side thereof. Notches 52 and 53 are constructed and arranged to be received within notches 30 and 20 formed on the upper notched surfaces 19 and 18 of carriage members 17 and 16 respectively.

Another elongated rail 60, disposed in parallel relation to elongated rail 40, is provided with an upper notched edge portion 61 containing a notch 62 to one side thereof aligned with the notch 42 of the elongated rail 40. In addition, the notched upper edge portion 61 is provided with a plurality of notches 63 through 70 aligned transversely of the notches 43 through 50 of elongated rail 40. The other elongated rail 60 provides the other longitudinal side of a frame-like support for a glass sheet during thermal treatment.

The elongated rail 60 has a lower notched portion 71 provided with a notch 72 aligned with notch 52 of elongated rail 40 and another notch 73 aligned with notch 53 of shaping rail 40. Notches 72 and 73 are received in any one of a pair of aligned notches 31 through 36 and 21 through 26 as desired.

A connecting rail 75 having an upper edge surface 76 that is curved in elevation and a lower notched surface 77 including a plurality of notches 78 through 82 toward one end thereof and additional notches 83 through 87 to the other side thereof (see FIG. 3) has one of its notches 78 to 82 interfitting notch 62 of elongated rail 60 and one of its notches 83 through 87 to the other side thereof interfitting notch 42 of elongated rail 40 to form one side edge of an outline frame for supporting a glass sheet for thermal treatment.

Another connecting rail 90 having an upper edge surface 91 curved in elevation and a lower notched edge portion 92 containing a plurality of notches 93 through 97 to one side thereof and notches 98 through 102 to the other side of the lower notched portion is interfitted into the other end of elongated rails 40 and 60 by engaging one of the downward facing notches 93 through 97 into one of the upwardly facing notches 63 through 70 of elongated rail 60 to one side of the connecting rail 90 and interfitting one of the downwardly facing notches 98 through 102 into the corresponding one of the notches 43 through 50 facing upwardly at the corresponding other end of the elongated rail 40. In this manner, the upper edge portion 41 of elongated rail 40, the upper edge portion 61 of elongated rail 60, the upper edge surface 76 of connecting rail 75 and the upper edge surface 91 of connecting rail 90 form a frame for supporting a glass sheet during thermal treatment. The notches contained in the upper and lower edge portions of the elongated rail 40 and 60 and the connecting rails 75 and 90 are so constructed and arranged that the size of the frame outline can be adjusted so that the glass supporting frame is slightly smaller in dimensions than the glass sheet to be supported.

In addition, it is possible to utilize the upper edges 41, 61, 76 and 91 of the elongated rails and the connecting rails to provide a shaping surface in case it is desired to shape the glass by gravity sagging. Under such circumstances, merely by replacing one or more of the elongated rails or connecting rails, it is possible to adjust the shape of the outline mold to that desired. For example, it is a simple matter to replace connecting rails 75 and/or 90 of 60 inch radius with such as 90′ having an upper shaping surface 91′ of 90 inch radius of curvature. The connecting rail 90′ is provided with a plurality of notches 93′ through 97′ to one side thereof and additional notches 98′ to 102′ thereof to the other side as shown in FIG. 4.

While the elongated rails 40 and 60 are shown substantially having upper edge portions 41 and 61 that are essentially flat along their length, these upper portions can also be curved in the manner depicted for the connecting rails 75 and 90. As a matter of fact, it is not at all necessary that the opposite rails have upper shaping edge surfaces that are identical in curvature to one another. It is possible by gravity sagging to form glass of non-uniform dimensions. It is also not necessary that the rails form a rectangular plan outline. The shaping rails may be interfitted to form oblique angles rather than right angles if so desired.

In FIG. 2 is shown an alternate embodiment of an elongated rail 140. In this embodiment, the upper edge portion 141 is provided with a plurality of notches 142 through 149 on one side thereof and a plurality of notches 162 through 169 to the other side thereof. The lower edge portion 151 of the elongated rail 140 is provided with notches 152 and 153 to be received in aligned notches contained in the upper surfaces of the spaced carriage members 16 and 17 as in the FIG. 1 embodiment.

It is noted the connecting rails of FIGS. 3 and 4 have notches formed in the lower edge portions that vary in depth. This difference in depth is the result of a desire to have the upper surfaces 76 and 91 of the connecting rails 75 and 90 interfit at the exact elevation of the upper edge portions 41 and 61 of the elongated rails 40 and 60 where the shaping surfaces form corners of the glass supporting frame. In other words, the notches are so formed that the vertical distance between the upper surface and the deepest portion of each notch is substantially equal throughout the length of each rail. This insures a smooth frame-like shaping surface for supporting a glass sheet of whatever shape is desired.

It is equally understood that all of the elongated and connecting rails may be flat in elevation for supporting a flat sheet for thermal treatment as well as being curved in elevation to conform to the outline desired.

It is also understood that the upper edge surfaces of the rails may be in oblique planes rather than horizontal planes that traverse the thickness dimension of the rails. For example, a rail interfitting with one curved concavely along its length should have its upper edge surface slanted obliquely downward and inward in the direction of its thickness. This slanting forms a smoother joint where the rails interfit than if the upper edge surface lies in a horizontal plane across the rail thickness.

In a particular illustrative embodiment of the present invention, the elongated runners 12 were formed of angles of stainless steel angles 1 inch by 1 inch by ⅛ inch, the oblique end portions 14 being bent to form an angle of 15 to 20 degrees with the horizontal to assure that the leading edges of the runners cleared the rolls of a conveyor used to transport the frame through a tunnel-like heating furnace.

The carriage members 16 and 17 of a typical embodiment were angles of ⅛ inch thick stainless steel including a vertical flange two inches high and a horizontal flange one inch wide and of a suitable length. The carriage members were welded at their ends to the angles forming the elongated runners.

The elongated rails 40 and 60 were formed from 3 inch wide by 3/16 inch thick stainless steel cut to the desired length. The lower notches 20, 21, 30 and 31 measured ⅛ inch wide and one inch deep. Notches 20 and 30 fit into notches 52 and 53 which were 3/16 inch wide by one inch deep. All the notches on the carriage members 16 and 17 were 3/16 inch wide by one inch deep, spaced one inch from one another center to center.

The upward facing notches of elongated rails 40 and 60 measured 3/16 inch wide by one inch deep which provided to receive the connecting rails which were also essentially 3/16 inch thick and a maximum height of three inches. The upper surfaces of the connecting rails 75 and 90 were cut and ground to the radius of curvature desired in the resulting pattern, for example, 90 inch radius, 75 inch radius, 60 inch radius, and 50 inch radius. The notches formed on the lower notched surface portions of each of the transverse connecting rails 75 measured 3/16 inch wide and were sufficiently deep so that the upper unnotched portion of the connecting rails fit within one of the recesses formed in the upwardly facing notched portions of the elongated rails 40 and 60.

The upper surfaces of the elongated rails 40 and 60 were inclined downwardly and laterally inwardly across their thickness by grinding. The oblique plane of their upper edge surfaces 41 and 61 was slanted to be tangent to a 75 inch radius of curvature. These elongated rails were used with various connecting rails having radii of curvature ranging from 50 to 90 inches to produce commercially acceptable glass windows. Typical rail sections are shown in FIG. 5.

The above described apparatus was used to produce multiple pane side lights for special bullet-resisting vehicles. Each of these vehicles was a custom job requiring special treatment. However, it was found that these mold constructions were so capable of producing glass within the requisite tolerances that such molds have been used to produce several patterns, interchanging the connecting rails 75 and 90 from pattern to pattern as needed.

What is claimed is:

1. In apparatus for supporting glass sheets for thermal processing comprising an open frame-like carriage comprising a pair of elongated, spaced, carriage members having an upward facing surface, and a glass sheet support apparatus of outline configuration supported by said carriage for supporting a glass sheet thereon adjacent its margin for thermal treatment, the improvement comprising a series of notches on the upward facing surface of said spaced carriage members, said glass sheet support apparatus comprising a pair of replaceable, elongated rails, each having upper and lower notched edge portions, each of said lower edge portions having a plurality of notches, a spaced pair of notches on said lower edge portion of one of said elongated rails fitting into aligned notches at one side of the longitudinal center of each of said elongated, spaced, carriage members, a spaced pair of notches on said lower edge portion of the other of said elongated rails fitting into aligned notches at the other side of the longitudinal center of each of said elongated, spaced, carriage members, said glass support apparatus also including a pair of replaceable, connecting rails, each of said connecting rails having a lower edge portion, a spaced pair of notches on said lower edge portion of one of said pair of connecting rails fitting into aligned notches in said upper notched portions of said elongated rails at one side of the longitudinal center of each of said elongated rails and another spaced pair of notches on said lower edge portion of the other of said pair of connecting rails fitting into aligned notches in said upper notched portions of said elongated rails at the other side of the longitudinal center of said elongated rails, thereby producing a glass supporting frame of outline configuration composed of replaceable rail sections adjustable in position relative to one another, wherein the upper surface of at least one of said rails comprising said glass support apparatus is curved in elevation, whereby said pair of replaceable elongated rails and said pair of replaceable connecting rails cooperate to provide an outline shaping surface having an outline slightly smaller than the outline of a glass sheet supported thereon for bending and conforming in elevation to the curved shape desired for said glass sheet peripheral portion after the latter is bent by gravity sagging, wherein said aligned notches in said upper notched portions include a spaced pair of notches at least one of which is one of a series of closely spaced notches, and said spaced pair of notches on said lower edge portion of each of said connecting rails includes at least one series of closely spaced notches, whereby said connecting rails may be interfit into said elongated rails to form a glass supporting frame of outline configuration composed of replaceable rail sections adjustable in position relative to one another.

2. The improvement according to claim 1, wherein at least one of said connecting rails has an upper edge surface of concave elevation and its notches are of different heights with the uppermost extremities of said notches spaced essentially equal vertical distances from said upper edge surface.

3. The improvement according to claim 2, wherein at least one of said elongated rails has an upper edge surface that lies in an oblique plane slanted obliquely downward and inward in the direction of its thickness in the vicinity of its point of interfitting with said one connecting rail so that its upper edge surface is more nearly tangential to said upper edge surface of concave elevation of said connecting rail than if said upper edge surface were disposed in a horizontal plane across its thickness, whereby a smooth joint is formed where the elongated rail interfits with the connecting rail.

References Cited

UNITED STATES PATENTS

| | | | |
|---|---|---|---|
| 3,173,781 | 3/1965 | Wampler | 65—290 |
| 3,304,142 | 2/1967 | Rockola | 312—205 |

S. LEON BASHORE, Primary Examiner

SAUL R. FRIEDMAN, Assistant Examiner

U.S. Cl. X.R.

65—107; 211—41, 184; 312—205